(12) United States Patent
Kawabata

(10) Patent No.: US 7,019,856 B2
(45) Date of Patent: Mar. 28, 2006

(54) SYSTEM AND METHOD FOR RECORDING/OUTPUTTING PERSONAL IMAGE INFORMATION

(75) Inventor: Kazuhiro Kawabata, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 753 days.

(21) Appl. No.: 09/785,529

(22) Filed: Feb. 20, 2001

(65) Prior Publication Data
US 2001/0035980 A1 Nov. 1, 2001

(30) Foreign Application Priority Data
Feb. 21, 2000 (JP) .............................. 2000-042654
Feb. 21, 2000 (JP) .............................. 2000-042656

(51) Int. Cl.
*G06F 15/00* (2006.01)
*H04N 1/00* (2006.01)
*H04N 1/387* (2006.01)
*H04N 1/46* (2006.01)

(52) U.S. Cl. ..................... 358/1.15; 358/403; 358/450; 358/501

(58) Field of Classification Search ............... 358/403, 358/3.24, 1.16, 505, 540, 448, 474, 302, 358/1.15, 1.18, 1.12, 501, 442, 450; 399/6, 399/1–3, 43, 79, 194; 705/14, 52–53, 77–79
See application file for complete search history.

(56) References Cited

U.S. PATENT DOCUMENTS

| 4,352,555 | A | * | 10/1982 | Dobbs et al. ................. 355/77 |
| 5,819,092 | A | * | 10/1998 | Ferguson et al. ........... 717/113 |
| 6,006,191 | A | * | 12/1999 | DiRienzo ....................... 705/2 |
| 6,297,853 | B1 | * | 10/2001 | Sharir et al. ................. 348/589 |
| 6,334,109 | B1 | * | 12/2001 | Kanevsky et al. ............ 705/14 |
| 6,381,029 | B1 | * | 4/2002 | Tipirneni ................... 358/1.14 |
| 6,647,372 | B1 | * | 11/2003 | Brady et al. .................. 705/14 |
| 6,891,635 | B1 | * | 5/2005 | Dutta ......................... 358/1.15 |
| 6,891,636 | B1 | * | 5/2005 | Kawai et al. .............. 358/1.18 |

FOREIGN PATENT DOCUMENTS

JP 11-203360 7/1999

\* cited by examiner

*Primary Examiner*—Kimberly Williams
*Assistant Examiner*—Charlotte M. Baker
(74) *Attorney, Agent, or Firm*—Oliff & Berridge, PLC

(57) ABSTRACT

There is provided a personal image information recording/outputting system capable of inexpensively acquiring an output matter (a printed matter of a photographic image or the like) of personal image information (digital image data) such as a facial photographic image, and allowing third parties to effectively utilize personal image information such as a facial photographic image or the like by permission of an owner of personal image information or the like. A photographic image managing part 12 of a center server 10 stores photographic image data 14 and personal data 15, which are transferred from a store server 20 or 30, in a data base 13, and retrieves and extract photographic image data 14 meeting required conditions, from the data base 13 on the basis of personal data 15. The photographic image managing part 12 manages the photographic image data so that a photographic image datum, which has been registered so as to give permission for third parties to use the photographic image datum, among a plurality of photographic image data which has been read by a media reading part 22 or 23 of the store server 20 or 30, can be taken out by persons concerned with an owner of the registered photographic image data (members of the owner's family and owner's friends) or third parties.

12 Claims, 13 Drawing Sheets

SYSTEM AND METHOD FOR RECORDING/OUTPUTTING PERSONAL IMAGE INFORMATION

BACKGROUND OF THE INVENTION

1. Field of the Invention

The present invention relates generally to a system for handling personal image information such as facial photographic images. More specifically, the invention relates to a personal image information recording/outputting system for outputting personal image information serving as digital image data to a recording medium such as a printed matter, a direct mail, a CD-ROM (compact disc-read only memory) or an MO (magneto-optical disc), via a network such as Internet.

2. Description of Related Background Art

Personal image information such as a facial photographic image is incorporated as digital image data into a personal computer by means of a digital camera, a scanner or the like to be personally outputted as a printed matter of a full-color photographic image by means of a printer adopting a thermal transfer recording system or an ink jet recording system.

As described in Japanese Patent Laid-Open Publication No. 11-203360, there is also known a service for managing user's digital image data on a network such as Internet and for accepting an order for a photographic development/print on the network.

As described above, the printed matters of photographic images are often obtained on the basis of digital image data. However, the cost of purchasing finally available printed matters is too high to widely utilize the printed matters in the world.

In the present circumstances, personal image information such as a facial photographic image is utilized within a range of user's relations such as user's family and friends. If permission of an owner who is an object of a photographic image and who owns personal image information is obtained, a photographic image which has been taken well should be widely and effectively utilized for normal purposes, not for wicked purposes. This is significant for both of the owner and the user of the personal image information. However, in the present circumstances, third parties have little opportunity to utilize such personal image information.

Moreover, in recent years, information services utilizing a so-called multimedia for handling various data, such as images, voices and characters, via a network such as Internet or via an optional communication medium are actively carried out. Among these services, information (advertisement information) such as advertisements for various business enterprises and organizations have been put to practical use, and their information contents are increasing. However, such advertisement information is mainly viewed on a monitor or listened from a speaker. In either cases, the information is instantaneously observed, and there are not many cases where the information can permanently stored. Even if the information can be outputted as full-color printed matters, there is a problem in that the cost of obtaining such printed matters is very high.

SUMMARY OF THE INVENTION

It is therefore an object of the present invention to eliminate the aforementioned problems and to provide a personal image information recording/outputting system and method capable of inexpensively acquiring an output matter (a printed matter of a photographic image or the like) of personal image information (digital image data) such as a facial photographic image, allowing third parties to effectively utilize personal image information (digital image data) such as a facial photographic image by permission of an owner of the personal image information, and inexpensively providing permanently storable advertisement information as an output matter via a network such as Internet.

In order to accomplish the aforementioned and other objects, according to a first aspect of the present invention, there is provided a personal image information recording/outputting system comprising: photographic image reading means for reading a photographic image datum; personal data inputting means for classifying personal information on the photographic image datum, which is read by the photographic image reading means, to input the classified personal information as a personal datum; photographic image managing means for storing the photographic image datum and the personal datum and for retrieving and extracting a photographic image datum meeting required conditions, on the basis of the personal datum; use consent advisability registering means for registering advisability of permission for third parties to use the photographic image datum which is read by the photographic image reading means; and output means for outputting the photographic image datum which is read by the photographic image reading means, wherein the photographic image managing means manages the photographic image datum so that a photographic image datum, which has been registered so as to give permission for third parties to use the photographic image datum, among a plurality of photographic image data which has been read by the photographic image reading means, can be taken out by persons concerned with an owner of the registered photographic image datum or third parties.

In the personal image information recording/outputting system according to the first aspect of the present invention, the photographic image reading means, the personal data inputting means, the use consent advisability registering means and the output means are preferably provided in a store server, and the photographic image managing means is preferably provided in a center server which is connected to the store server via a network. The personal image information recording/outputting system preferably further comprises fee paying means for executing a fee paying processing, and the output means preferably outputs the photographic image datum after the fee paying processing is executed by the fee paying means. The fee paying means preferably changes the setting of a fee in accordance with the advisability of permission for third parties to use, which has been registered by the use consent advisability registering means. The photograph image reading means preferably reads a photograph image datum, which has been picked up by a digital camera to be stored in a data storage medium, from the data storage medium.

According to a second aspect of the present invention, there is provided a personal image information recording/outputting system comprising: photographic image reading means for reading a photographic image datum; advertisement image managing means for storing an advertisement image data and for selecting and extracting an advertisement image data meeting required conditions; and output means for outputting the photographic image datum, which is read by the photographic image reading means, together with the advertisement image datum which is extracted by the advertisement image managing means.

In the personal image information recording/outputting system according to the second aspect of the present invention, the photographic image reading means and the output means are preferably provided in a store server, and the advertisement image managing means is preferably provided in an advertisement server which is connected to the store server via a network. The personal image information recording/outputting system preferably further comprises fee paying means for executing a fee paying processing, and the output means preferably outputs the photographic image datum together with the advertisement image datum after the fee paying processing is executed by the fee paying means. The personal image information recording/outputting system preferably further comprises personal data inputting means for classifying personal information on the photographic image datum, which is read by the photographic image reading means, to input the classified personal information as a personal datum, and the advertisement image managing means preferably retrieves and extracts an advertisement image datum on the basis of the personal data which is inputted by the personal data inputting means. The photographic image reading means preferably reads a photographic image datum, which has been picked up by a digital camera to be stored in a data storage medium, from the data storage medium. Furthermore, an output matter outputted from the output means is preferably a printed matter on which a photographic image and an advertisement image are laid out in accordance with a predetermined format.

According to a third aspect of the present invention, there is provided a personal image information recording/outputting method comprising the steps of: reading a photographic image datum; registering advisability of permission for third parties to use the read photographic image datum; storing a photographic image datum, which is registered so as to give permission for third parties to use the photographic image datum, among a plurality of read photographic image data, together with a personal datum which is obtained by classifying personal information on the read photographic image datum, in a data base; and outputting the read photographic image datum.

The personal image information recording/outputting method according to the third aspect of the present invention preferably further comprises a step of retrieving and extracting a photographic image datum meeting required conditions, from the read photographic image data, which has been stored in the data base, on the basis of the personal datum.

According to a fourth aspect of the present invention, there is provided a personal image information recording/outputting method comprising the steps of: reading a photographic image datum; selecting and extracting an advertisement image datum meeting required conditions, from a plurality of advertisement image data which has been stored in a data base; and outputting the read photographic image datum, together with the extracted advertisement image datum.

According to the present invention, among photographic image data which have been read by the photographic image reading means, photographic image data registered by the use consent advisability registering means so as to give permission for third parties to use the photographic image data, together with personal data obtained by classifying personal information on the photographic image data which have been inputted by the personal data inputting means, is stored, and managed by the photographic image managing means so that the registered photographic image data can be taken out by persons concerned with the owner of the photographic image data and third parties. Therefore, the owner of the personal image information and persons concerned with the owner can acquire the output matter of the photographic image data (the printed matter of the photographic image or the like) free of charge or at a low set charge in return for permission for third parties to use the photographic image data, and third parties can effectively utilize the personal image information (digital image data) such as a facial photographic image or the like, by permission of the owner of the personal image information or the like.

In addition, according to the present invention, since photographic image data which have been read by the photographic image reading means, together with advertisement image data which have been extracted by the advertisement image managing means, are outputted from the output part, it is possible to subtract an advertisement rate from a charge for a printed matter on which only the photographic image data are simply recorded, so that it is possible to acquire the printed matter at a low charge. In addition, since the advertisement image data are recorded on the printed matter on which the photographic image data are recorded, it is possible to inexpensively provide permanently storable advertisement information as an output matter. Moreover, the current information which is periodically updated can be provided as advertisement image data, and the user can not only enjoy the photographic image data, but the user can also hold the current, appropriate advertisement information. This is very useful.

DETAILED DESCRIPTION OF THE PREFERRED EMBODIMENTS

Referring now to the accompanying drawings, the preferred embodiments of the present invention will be described below.

First Preferred Embodiment

First, referring to FIGS. 1 through 5, the first preferred embodiment of a personal image information recording/outputting system according to the present invention will be described below.

Figure 1:
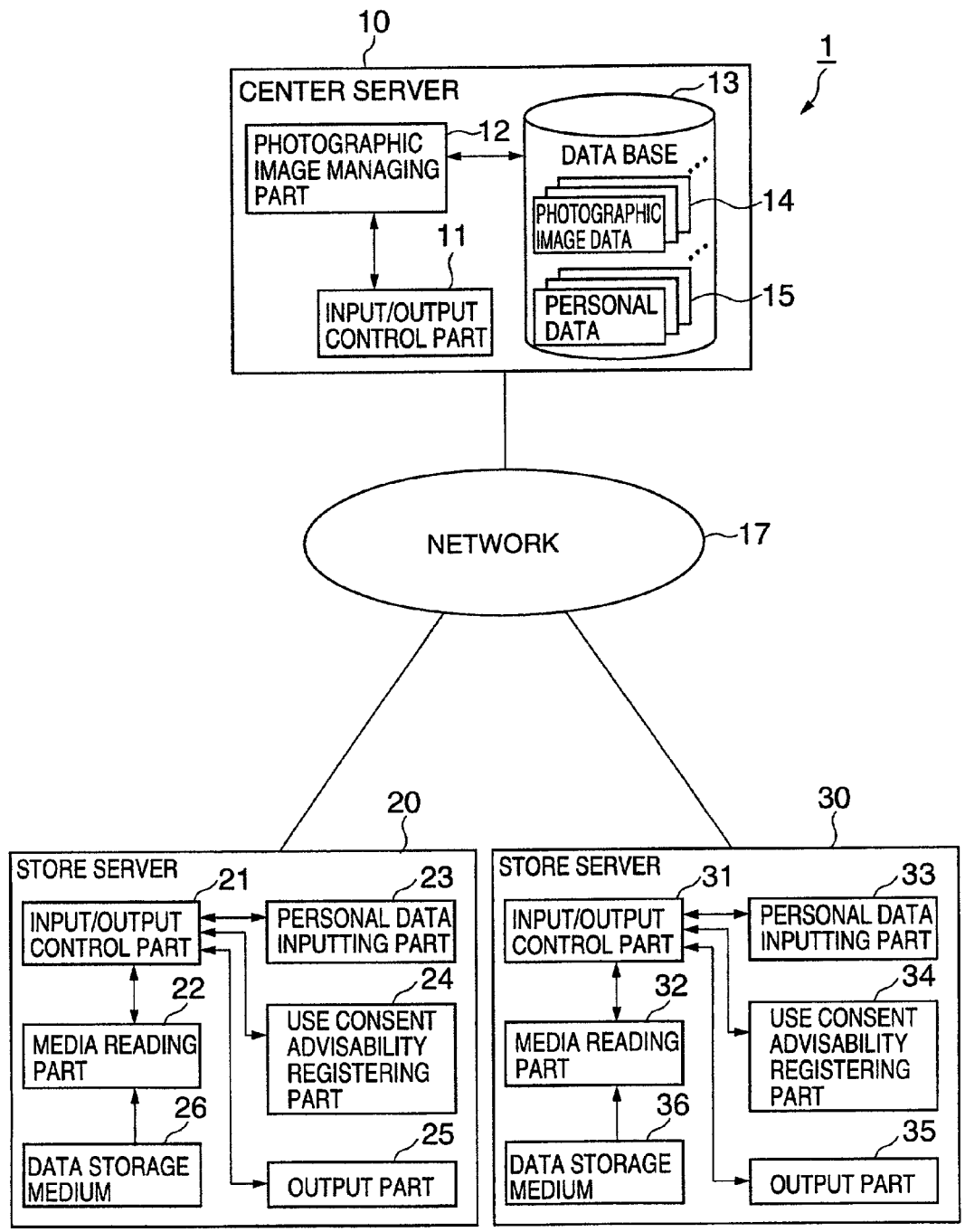
FIG. 1 is a schematic diagram showing an example of the first preferred embodiment of a personal image information recording/outputting system according to the present invention.

As shown in FIG. 1, the first preferred embodiment of a personal image information recording/outputting system 1 according to the present invention comprises store servers 20 and 30 which are installed in two areas geographically spaced from each other, and a center server 10 which is connected to the store servers 20 and 30 via a network 17.

Among these store servers, the store server 20 installed in a certain area comprises an input/output control part 21 for controlling the processing in each part of the store server 20 and the input/output of data between the store server 20 and the network 17; and a media reading part (photographic image reading means) 22, a personal data inputting part 23, a use consent advisability registering part 24, and an output part 25, which are connected to the input/output control part 21. Similarly, the store server 30 installed in another area comprises an input/output control part 31 for controlling the processing in each part of the store server 30 and the input/output of data between the store server 30 and the network 17; and a media reading part (photographic image reading means) 32, a personal data inputting part 33, a use consent advisability registering part 34, and an output part 35, which are connected to the input/output control part 31.

The media reading parts 22 and 32 are designed to read photographic image data (digital image data), which have been picked up by means of a digital camera to be stored in data storage media 26 and 36, from the data storage media 26 and 36, respectively. Furthermore, the data storage media 26 and 36 may be selected from various recording media such as smart media, CF (compact flash) cards, PC cards, floppy discs, MOs (magneto-optical discs) and CD-Rs (compact disc-recordable). The media reading parts 22 and 32 have drives for reading and writing the photographic image data from and in the data storage media 26 and 36 so as to correspond to the kinds and image formats of the data storage media 26 and 36, respectively. Furthermore, the photographic image reading means for reading the photographic image data from the data storage media 26 and 36 may include a scanner for reading a digital image from a silver salt photograph which is an analog photograph, and an apparatus for reading a digital image directly from a digital camera, which is installed in the store, to transfer the read digital image to the center server 10, in addition to the media reading parts 22 and 32.

The personal data inputting parts 23 and 33 have a keyboard, a touch panel or the like for classifying personal information on photographic image data, which have been read by the media reading parts 22 and 32, to input the classified personal information as personal data in accordance with a predetermined format, respectively. As a system for inputting such personal data, there may be adopted a fixed coding system for electing a distinction between one or more persons and animals and plants about an object(s), sexuality, date and so forth from a predetermined hierarchy. Such a fixed coding system is preferred since it can more simply carry out a rapid processing without complicating the construction of the center server 10 for managing photographic and personal data. Furthermore, if the classification of personal information using such a fixed coding system leaves something to be desired, a system for directly inputting keywords characterizing personal information may be used together with the fixed coding system. However, the number of the keywords thus inputted is preferably limited. Thus, the storage capacity of the center server 10 in which photographic image data are stored can have a margin, so that many persons can utilize the system as a system in which much photographic data are incorporated.

Furthermore, as the personal data inputted by the personal data inputting parts 23 and 33, e.g., data for more accurately identifying a person, such as a full name, age (a personal age, not the assignment of a range such as date) and the position in a family make-up (the first-born son, the first-born daughter, grandchild, etc.), may be inputted as variable codes. Thus, the center server 10 can have a so-called album managing function of collectively managing photographic images of the person and/or members of the person's family. Specifically, for example, if the first-born son "Dainippon Ichiro" is identified in the store server 20 or 30, all of the photographic images of "Dainippon Ichiro" can be retrieved and extracted, and if necessary, all of the photographic images in his primary school days can be edited to be outputted as an index print so that a plurality of, e.g., 36, photographic images are laid out on a single printed matter at a scale of 1 to 36. Thus, the photographic images of the person and/or members of the person's family can be suitably edited and outputted. It is also possible to provide a service wherein the calculation of the age(s) of the person and/or members of the person's family and the confirmation of an engagement, a wedding and so forth are carried out in accordance with the increase of the age(s) of the person and/or members of the person's family, e.g., in accordance with commemoration at the turning points in the person and/or members of the person's family, such as a birth, a festival for children of three, five and seven years of age, entrance into a kindergarten, entrance into a primary school, entrance into a junior high school, entrance into a high school, entrance into a university, a coming-of-age ceremony, entrance into employment, an engagement, a wedding ceremony and a birth, and a direct mail is dispatched every the turning point or a printed matter having a cabinet size is sent every birth day to the person or the member of the person's family from a related client.

The use consent advisability registering parts 24 and 34 are designed to register the advisability of permission for third parties to use photographic image data which have been read by the media reading parts 22 and 32. That is, the use consent advisability registering parts 24 and 34 are designed to register whether an owner of photographic image data or the owner's substitute gives permission for third parties to utilize the photographic image data (for example, for third parties to utilize the photographic image data as an image of an advertisement poster for an advertisement for a business enterprise or as an illustration of a calendar for general consumers). Furthermore, the use consent advisability registering parts 24 and 34 preferably register the advisability of permission for third parties to use the photographic image data while confirming the photographic image data serving as an object by means of a monitor or the like.

In return for such permission for third parties to use the photographic image data, the owner of the photographic image data may be capable of acquiring the output matter of the photographic image data (the printed matter of a photographic image or the like) free of charge or at a low set charge, or members of the owner's family or the owner's friends may also be capable of acquiring the output matter of the photographic image data (the printed matter of a photographic image) free of charge or at a low set charge on given conditions (e.g., limit to the number of outputs) by inputting a pass-word, an authentication number or an identification code. When a third party actually utilizes the photographic image data which have been permitted to be used (when the third party utilizes the photographic image data for the purpose of gain to make a profit), the third party may pay a license fee to the owner or the like of the photographic image data on the basis of a predetermined calculation standard or the like in return.

The output parts 25 and 35 are designed to output the photographic image data which have been read by the media reading parts 22 and 32, respectively. As the output parts 25 and 35, a digital printer for preparing a full-color printed matter (hard copy) of the photographic image data may be used. Specifically, a digital printer adopting a thermal transfer recording system such as a sublimation transfer recording system or a thermal melting recording system, or a digital printer adopting an ink jet recording system may be used. However, a digital printer adopting a sublimation transfer recording system is preferably used since it is possible to form a high quality image equal to a full-color silver salt photographic image. Furthermore, the output parts 25 and 36 should not be limited to digital printers for preparing the printed matters of the photographic image data, but they include a drive for writing the photographic image data in a data storage medium such as a smart medium.

On the other hand, the center server 10 comprises an input/output control part 11 for controlling the processing in each part of the center server 10 and the input/output of data between the center server 10 and the network 17, a photographic image managing part 12 connected to the input/output control part 11, and a data base 13 managed by the photographic image managing part 12.

The photographic image managing part 12 is designed to store photographic image data 14 and personal data 15, which are transferred from the store servers 20 and 30, in the data base 13 and to retrieve and extract the photographic image data 14, which meets required conditions, from the data base 13 on the basis of the personal data 15. Furthermore, the photographic image managing part 12 is designed to manage photographic image data, which have been registered by the use consent advisability registering part 24 or 34 so as to give permission for third parties to use the photographic image data, among the photographic image data, which have been read by the media recording parts 24 and 34 of the store servers 20 and 30, so that persons concerned with the owner of the photographic image data (members of the owner's family or the owner's friends) and third parties can take the registered photographic image data.

Specifically, for example, when a third party requests to utilize an image showing the scene where a baby girl is innocently laughing, as an image of an advertisement poster for an advertisement for a business enterprise, among much photographic image data 14 which have been stored in the data base 13 of the center server 10, "human" as the distinction between persons and animals and plants, "female" as sexuality, "baby" as date, "laugh" or "playing" as keywords for the photographic image data are inputted as conditions for photographic image data to be retrieved. The conditions thus inputted are transferred to the center server 10 from the store server 20 or 30 via the network 17, and the photographic image data 14 satisfying all of the conditions is retrieved and extracted from the data base 13. At this time, the extracted photographic image data is preferably displayed on a monitor or the like of the store server 20 or 30 to select a photographic image data, which meets required conditions, while confirming the monitor or the like. The selected photographic image data are outputted as a full-color printed matter (hard copy) from the output parts 25 and 35, or written in a data storage medium such as a smart medium.

While the personal data 15 have been identified by fixed codes such as the distinction between person(s) and animals and plants, sexuality and date, and keywords related to photographic image data, a specialized company or the like for managing the center server 10 may be commissioned to retrieve and extract a photographic image to provide the extracted photographic image data for a third party who hopes to acquire the photographic image data, if the personal data is not simple data which are identified by only fixed codes and keywords.

While the store servers 20 and 30 of the personal image information recording/outputting system 1 shown in FIG. 1 have been installed in two areas, the number of store servers and installed areas should not be limited thereto, but a large number of store servers may be installed in a large number of areas. Furthermore, the network 17 means a network mainly including Internet or the like, and includes all of communication media having a transmission speed sufficient to transfer photographic image data and personal data, such as dedicated lines, CATV (cable television) networks, dial-up connection networks and LANs (local area networks).

Figure 2:
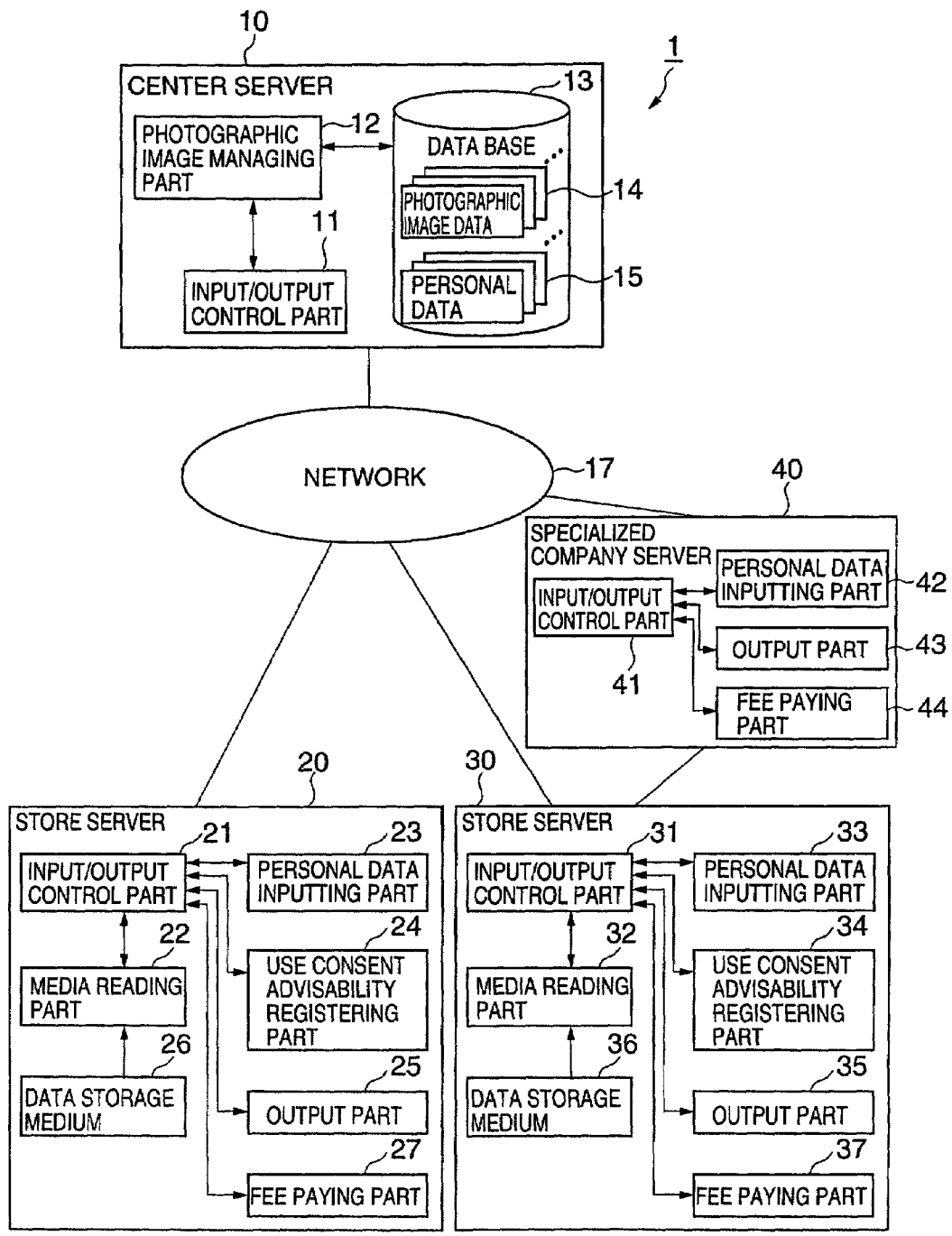
FIG. 2 is a schematic diagram showing another example of the first preferred embodiment of a personal image information recording/outputting system according to the present invention.

As shown in FIG. 2, the personal image information recording/outputting system 1 shown in FIG. 1 may be provided with fee paying parts 27 and 37 in the store servers 20 and 30, respectively, or may be newly provided with a specialized company server 40 having an output part 43 and a fee paying part 44.

As shown in FIG. 2, the store servers 20 and 30 further comprise the fee paying parts 27 and 37 of a coin input type or the like for executing a fee paying processing, respectively. After a hundred-yen coin or the like is thrown into a fee paying opening of the fee paying part 27 or 37 to execute the fee paying processing, the output part 25 or 35 is designed to output the photographic image data. The fee paying parts 27 and 37 are preferably designed to change the setting of the fee (to free of charge or a low set charge) in accordance with the advisability of permission for third parties to use, which has been registered by the use consent advisability registering parts 24 and 34, respectively.

In a different area from the areas in which the store servers 20 and 30 are installed, a specialized company server 40 capable of accessing the center server 10 is installed. The specialized company server 40 comprises an input/output control part 41 for controlling the processing in each part of the specialized company server 40 and the input/output of data between the specialized company server 40 and the network 17; and a personal data inputting part 42, an output part 43 and a fee paying part 44, which are connected to the input/output control part 41. The personal data inputting part 42 of the specialized company server 40 inputs conditions on photographic image data serving as a retrieved object, and photographic image data which meets conditions requested by the data base 13 of the center server 10 is retrieved and extracted. Thereafter, the fee paying part 44 calculates a fee based on a contract to consent to use and effectively utilize the photographic image data, and confirms the contents of the contract based thereon, between the third party and the owner of the photographic image data or via a specific company between the third party and the owner of the photographic image data. After the fee paying part 44 thus calculates the fee and confirms the contents of the contract and after the amount of the fee and conditions on the method of payment and so forth are decided, the output part 43 outputs the photographic image data. The photographic image data thus retrieved and extracted is outputted as a full-color printed matter (hard copy) or written in a data storage medium such as a smart medium, by the output part 43. Alternatively, the photographic image data may be transferred to the store server 20 or 30 in each area via the network 17 or the like to be outputted as a full-color printed matter (hard copy) or written as a data storage medium such as a smart medium, by the output part 25 or 35 of the store server 20 or 30.

The operation of the first preferred embodiment of the present invention with this construction will be described below. The operation of the personal image information recording/outputting system 1 shown in FIG. 2 will be herein described as an example.

Figure 3:
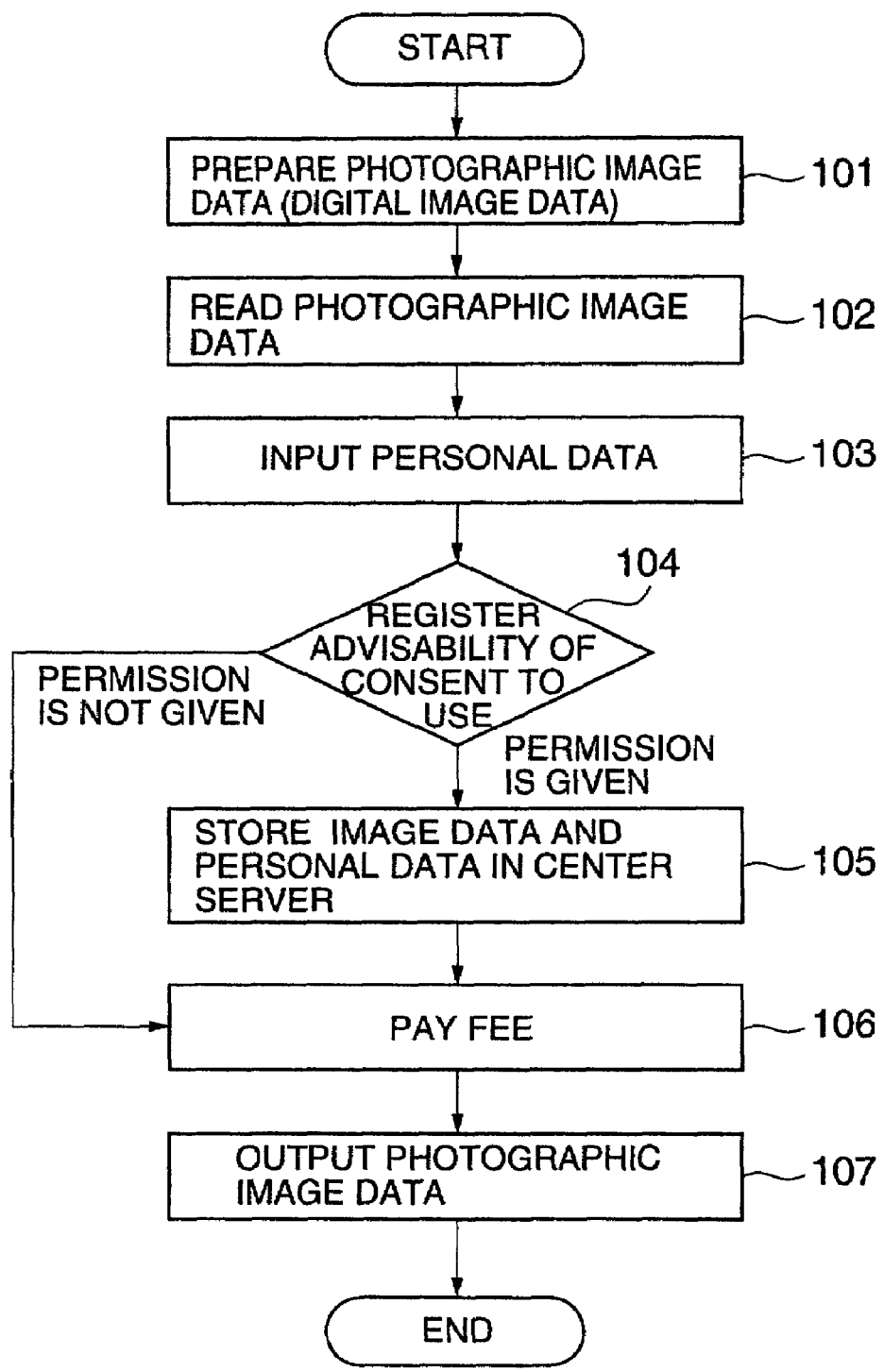
FIG. 3 is a flow chart for explaining the flow of a processing which is carried out by an owner of photographic image data or the owner's substitute, in the first preferred embodiment of a personal image information recording/outputting system according to the present invention.

FIG. 3 is a flow chart for explaining the flow of a processing which is carried out by an owner of photographic image data or the owner's substitute in the personal image information recording/outputting system 1 shown in FIG. 2.

As shown in FIG. 3, first, a picture of a face or the like of an object is taken by a digital camera to prepare photographic image data (digital image data) (step 101). The photographic image data thus prepared are stored in the data storage medium 26 or 36.

Then, the photographic image data thus stored in the data storage medium 26 or 36 are read by the media reading part 22 or 32 of the store server 20 or 30 (step 102).

Thereafter, personal information related to the photographic image data read by the media reading part 22 or 32 is classified by means of the keyboard or touch sensor panel of the personal data inputting part 23 or 33 of the store server 20 or 30 to be inputted as personal data in accordance with a predetermined format (step 103).

Moreover, the advisability of permission for third parties to use the photographic image data, which have been read by the media reading part 22 or 32, is registered by the use consent advisability registering part 24 or 34 of the store server 20 or 30 (step 104).

When the permission for third parties to use the photographic image data is given, the photographic image data and the personal data are transferred to the center server 10 to be stored in the data base 13 of the center server 10 (step 105).

Thereafter, a fee is paid for the output of the photographic image data (the output as a printed matter, the writing in a data storage medium, or the like), by means of the fee paying part 27 or 37 of the store server 20 or 30 (step 106). When the permission for third parties to use the photographic image data is given at step 104, the fee required at step 106 is a low set fee (free of charge according to circumstances).

Finally, after the fee paying part 27 or 37 executes the fee paying processing, the output part 25 or 35 outputs the photographic image data (step 107). The photographic image data is outputted as a full-color printed matter (hard copy) or written in a data storage medium such as a smart medium.

When the permission for third parties to use the photographic image data is not given at step 104, the routine jumps step 105 to go to the next step 106 without the transferring of the graphic image data and personal data to the center server 10. In this case, the fee required at step 106 is a high set fee.

Figure 4:
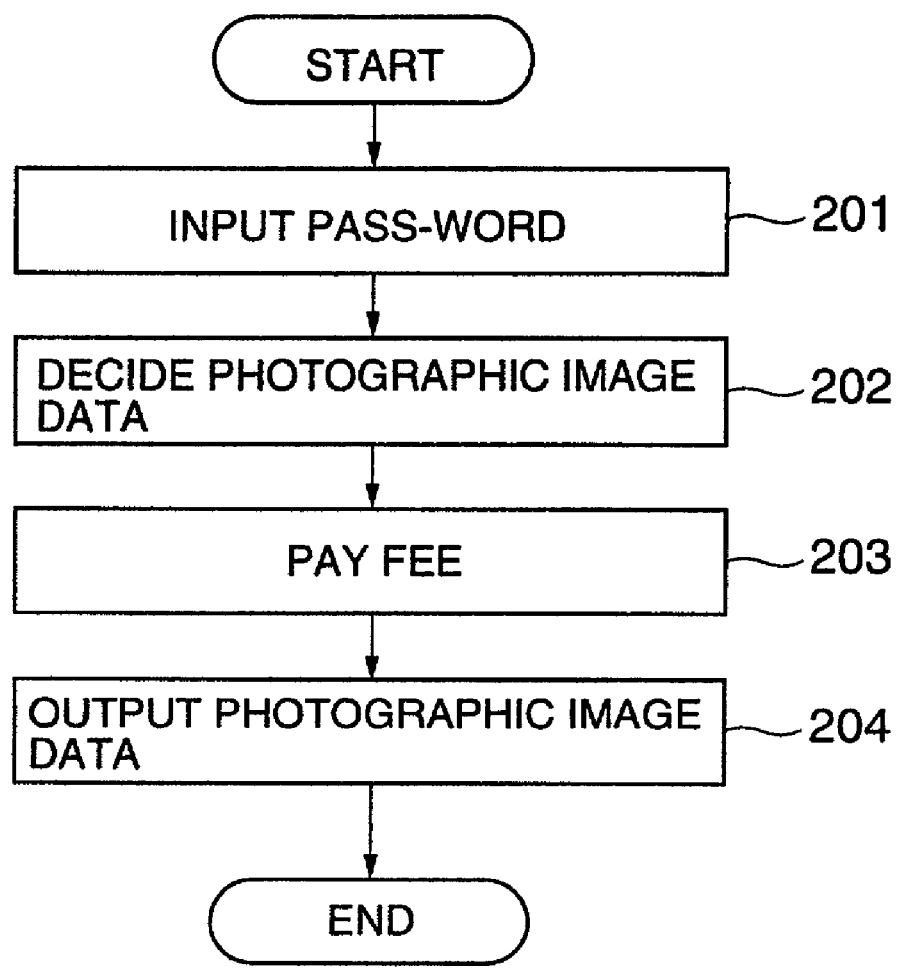
FIG. 4 is a flow chart for explaining the flow of a processing which is carried out by a person concerned with an owner of photographic image data (a member of the owner's family, the owner's friend or the like), in the first preferred embodiment of a personal image information recording/outputting system according to the present invention.

FIG. 4 is a flow chart for explaining the flow of a processing which is carried out by a person concerned with an owner of a photographic image data (a member of the owner's family or an owner's friend) in the first preferred embodiment of a personal image information recording/outputting system according to the present invention. As an example, there will be herein described a case where the photographic image data 14 and personal data 15 which have been permitted to be used by third parties are stored in the data base 13 of the center server 10 and where the photographic image data 14 are managed by the photographic image managing part 12 of the center server 10.

As shown in FIG. 4, first, a pass-word, an authentication number, an identification code and so forth for accessing the center server 10 are inputted by means of a keyboard or touch sensor panel of the personal data inputting part 23 or 33 in the store server 20 or 30 (step 201).

Then, photograph image data to be taken out of the photographic image data stored in the data base 13 of the center server 10 is determined while being displayed on the monitor or the like of the store server 20 or 30 to be confirmed (step 202). At this time, the photographic image data to be taken may be determined by only the pass-word and so forth which are inputted at step 201.

Thereafter, a fee is paid for the output of the photographic image data (the output as a printed matter, the writing in a data storage medium, or the like), by means of the fee paying part 27 or 37 of the store server 20 or 30 (step 203). Since the owner of the photographic image data has given permission for third parties to use the photographic image data, the required fee is a low set fee (free of charge according to circumstances).

Finally, after the fee paying part 27 or 37 executes the fee paying processing, the output part 25 or 35 outputs the photographic image data (step 204). The photographic image data are outputted as a full-color printed matter (hard copy) or written in a data storage medium such as a smart medium.

The processes shown in FIGS. 3 and 4 can be realized as a program or control box for carrying out a series of operations and processes in the store servers 20 and 30.

Figure 5:
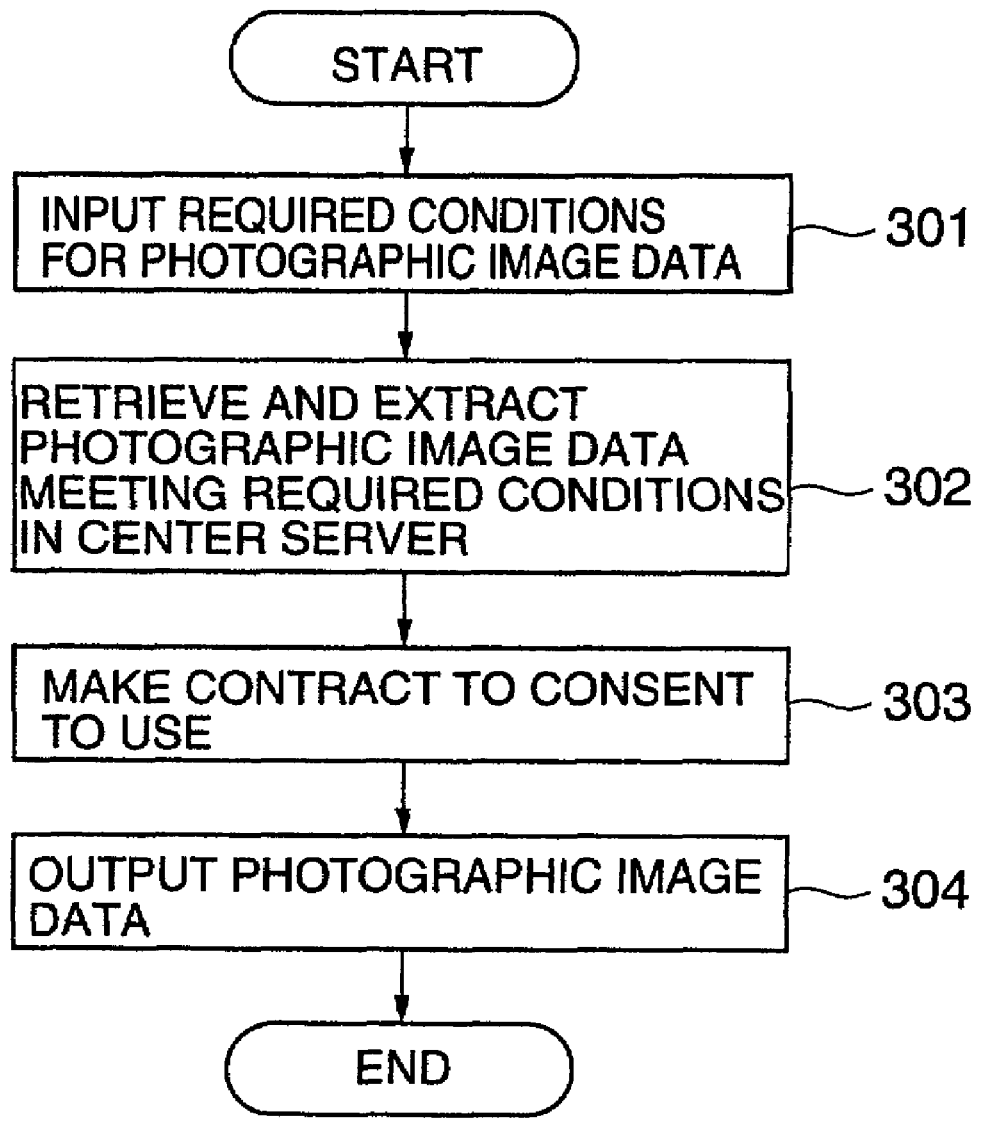
FIG. 5 is a flow chart for explaining the flow of a processing which is carried out by a third party, who hopes to acquire photographic image data, in the first preferred embodiment of a personal image information recording/outputting system according to the present invention.

FIG. 5 is a flow chart for explaining the flow of a processing, which is carried out by a third party who hopes to acquire photographic image data, in the first preferred embodiment of a personal image information recording/ outputting system according to the present invention. As an example, there will be herein described a case where the photographic image data 14 and personal data 15 which have been permitted to be used by third parties are stored in the data base 13 of the center server 10 and where the photographic image data 14 are managed by the photographic image managing part 12 of the center server 10.

As shown in FIG. 5, first, a third party who hopes to acquire photographic image data for the purpose of gain or the public good inputs fixed codes (the distinction between person(s) and animals and plants, sexuality, date and so forth) and keywords as conditions on the photographic image data serving as a retrieved object, by means of the personal data inputting part 23 or 33 of the store server 20 or 30 or by means of the personal data inputting part 42 of the specialized company server 40 (step 301).

The conditions thus inputted are transferred from the store server 20 or 30 to the center server 10 via the network 17, so that the photographic image data 14 meeting all of the conditions are retrieved to be extracted from the data base 13 by means of the photographic image managing part 12 of the center server 10 (step 302).

Thereafter, the fee paying part 27 or 37 of the store server 20 or 30, or the fee paying part 44 of the specialized company server 40 calculates a fee based on a contract to consent to use the photographic image data, and confirms the contents of the contract based thereon, to decide the amount of the fee and conditions on the method of payment and so forth (step 303).

Finally, after steps 302 and 303 are completed, the output part 25 or 35 of the store server 20 or 30, or the output part 43 of the specialized company server 40 outputs the photographic image data. The photographic image data are outputted as a full-color printed matter (hard copy) or written in a data storage medium such as a smart medium.

The processing shown in FIG. 5 can be realized as a program or control box for carrying out a series of operations and processes in the store servers 20 and 30 or in the specialized company server 40 which is controlled by a company or organization serving as a third party.

Thus, according to the first preferred embodiment of the present invention, photographic image data which have been registered by the use consent advisability registering part 24 or 34 so as to give permission for third parties to use the photographic image data, among the photographic image data which have been read by the media recording part 24 or 34 of the store server 20 or 30, together with personal data which have been obtained by classifying personal information related to the photographic image data inputted by the personal data inputting part 23 or 33, is stored in the data base 13 of the center server 10, and the photographic image data are managed by the photograph image managing part 12 of the center server 10 so that persons concerned with the owner of the photographic image data and third parties can take the photographic image data. Therefore, in return for permission for third parties to use the photographic image data, the owner of the photographic image data and the persons concerned with the owner can acquire the output matter of the photographic image data (the printed matter of a photographic image or the like) free of charge or at a low set charge, and the third parties can effectively utilize the personal image information (digital image data) such as a facial photographic image or the like by permission of the owner of the personal image information.

Second Preferred Embodiment

Referring to FIGS. 6 through 15, the second preferred embodiment of a personal image information recording/outputting system according to the present invention will be described below.

Figure 6:
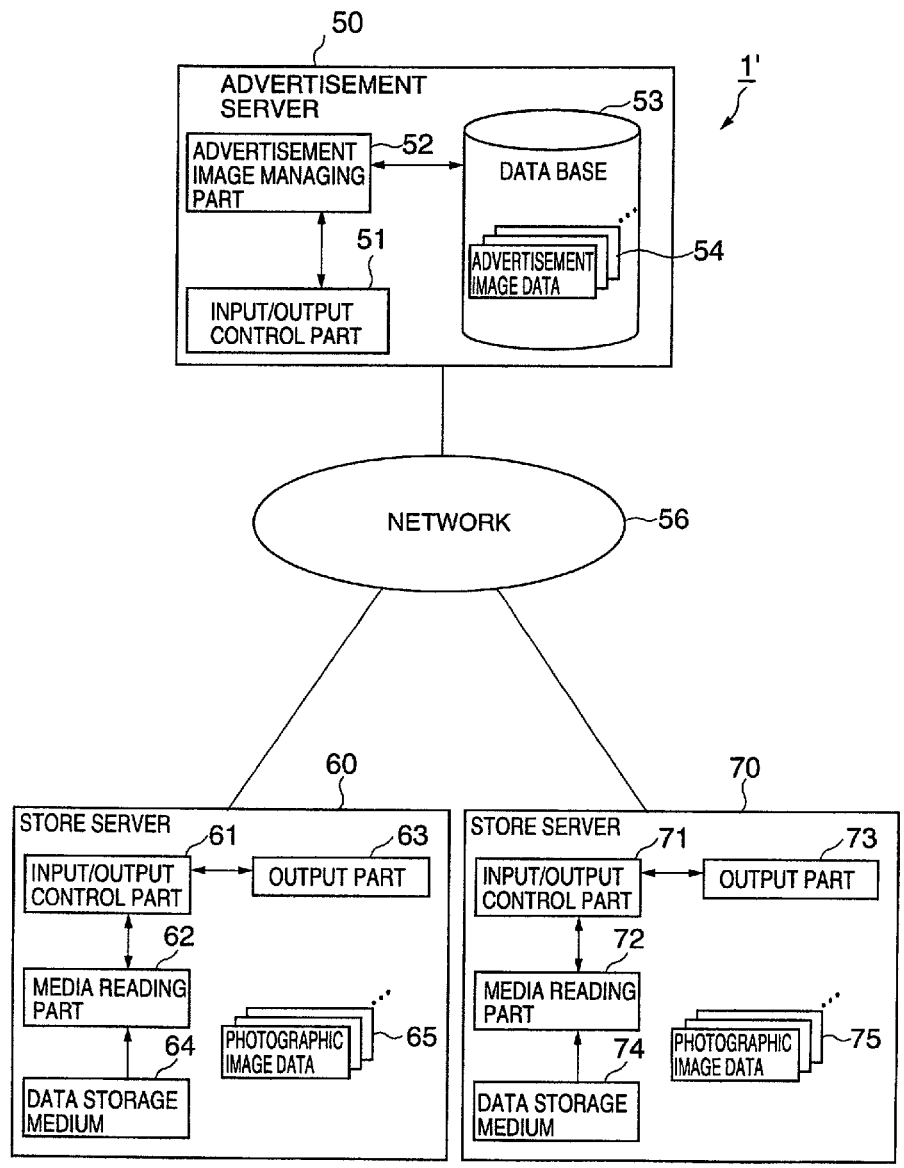
FIG. 6 is a schematic diagram showing an example of the second preferred embodiment of a personal image information recording/outputting system according to the present invention.

As shown in FIG. 6, the second preferred embodiment of a personal image information recording/outputting system 1' according to the present invention comprises store servers 60 and 70 which are installed in two areas geographically spaced from each other, and an advertisement server 50 which is connected to the store servers 60 and 70 via a network 56.

Among these store servers, the store server 60 installed in a certain area comprises an input/output control part 61 for controlling the processing in each part of the store server 60 and the input/output of data between the store server 60 and the network 56; and a media reading part (photographic image reading means) 62 and an output part 63, which are connected to the input/output control part 61. Similarly, the store server 70 installed in another area comprises an input/output control part 71 for controlling the processing in each part of the store server 70 and the input/output of data between the store server 70 and the network 56; and a media reading part (photographic image reading means) 72 and an output part 73, which are connected to the input/output control part 71.

The media reading parts 62 and 72 are designed to read a photographic image data (digital image data), which have been picked up by means of a digital camera to be stored in data storage media 64 and 74, from the data storage media 64 and 74, respectively. Furthermore, the data storage media 64 and 74 may be selected from various recording media such as smart media, CF (compact flash) cards, PC cards, floppy discs, MOs (magneto-optical discs) and CD-Rs (compact disc-recordable). The media reading parts 62 and 72 have drives for reading and writing the photographic image data 65 and 75 from and in the data storage media 64 and 74 so as to correspond to the kinds and image formats of the data storage media 64 and 74, respectively. Furthermore, the photographic image reading means for reading the photographic image data 65 and 75 from the data storage media 64 and 74 may include a scanner for reading a digital image from a silver salt photograph which is an analog photograph, and an apparatus for reading a digital image directly from a digital camera, which is installed in the store, to output the read digital image from the output parts 63 and 73, in addition to the media reading parts 62 and 72.

The output parts 63 and 73 are designed to output the photographic image data 65 and 75 which have been read by the media reading parts 62 and 72, respectively, together with advertisement image data 54 which have been extracted by an advertisement image managing part 52 of the advertisement server 50 which will be described later. As the output parts 63 and 73, a digital printer for preparing a full-color printed matter (hard copy) of the photographic image data may be used. Specifically, a digital printer adopting a thermal transfer recording system such as a sublimation transfer recording system or a thermal melting recording system, or a digital printer adopting an ink jet recording system may be used. However, a digital printer adopting a sublimation transfer recording system is preferably used since it is possible to form a high quality image equal to a full-color silver salt photographic image. Furthermore, the output parts 63 and 73 should not be limited to digital printers for preparing the printed matters of the photographic image data, but they include a drive for writing the photographic image data in a data storage medium such as a smart medium.

On the other hand, the advertisement server 50 comprises an input/output control part 51 for controlling the processing in each part of the advertisement server 50 and the input/output of data between the advertisement server 50 and the network 56, an advertisement image managing part 52 connected to the input/output control part 51, and a data base 53 managed by the advertisement image managing part 52.

The advertisement image managing part 52 is designed to store the advertisement image data 54, which are intended to be given wide publicity by an advertiser, in the data base 53 and to select and extract the advertisement image data 54, which meet required conditions, by a predetermined method. The advertisement image data 54 thus extracted are transferred from the advertisement server 50 to the store server 60 or 70 via the network 56. Then, the advertisement image data 54, together with the photographic image data 65 or 75, are outputted by the output part 63 or 73 of the store server 60 or 70 after being laid out on a predetermined printed matter in accordance with a predetermined format.

When the advertisement image data 54 are stored in the data base 53 of the advertisement server 50, the advertiser decides conditions on an advertisement appearing period, an advertisement appearing frequency, an advertisement rate and so forth to make a contract with a company or organization for managing the advertisement server 50. For example, the contents of the contract include (1) the advertisement appearing period is 2 months, (2) a required advertisement image is laid out to be outputted on one of ten printed matters when the total number of the outputs of the advertisement image data using one printer reaches 10, and (3) the advertisement rate are paid at a rate of 20 yen every one printed matter, on which the advertisement image is laid out to be outputted, and the total amounts of the outputs are paid.

A plurality of advertisement image data 54 may have been stored in the data base 53 of the advertisement server 50, and advertisement image data 54 which are provided for the store server 60 or 70 may be changed under predetermined update conditions. Specifically, for example, if the conditions include that the advertisement image data are updated every, e.g., 2 months, the next advertisement image data to be provided are selected to update the last advertisement image data to the new advertisement image data. By thus periodically updating the advertisement image data, it is possible to timely provide current advertisement information for users. This is of advantage to both of the advertiser and users.

FIGS. 11 through 15 are schematic diagrams showing examples of a layout of photographic and advertisement images on a printed matter.

Figure 11:
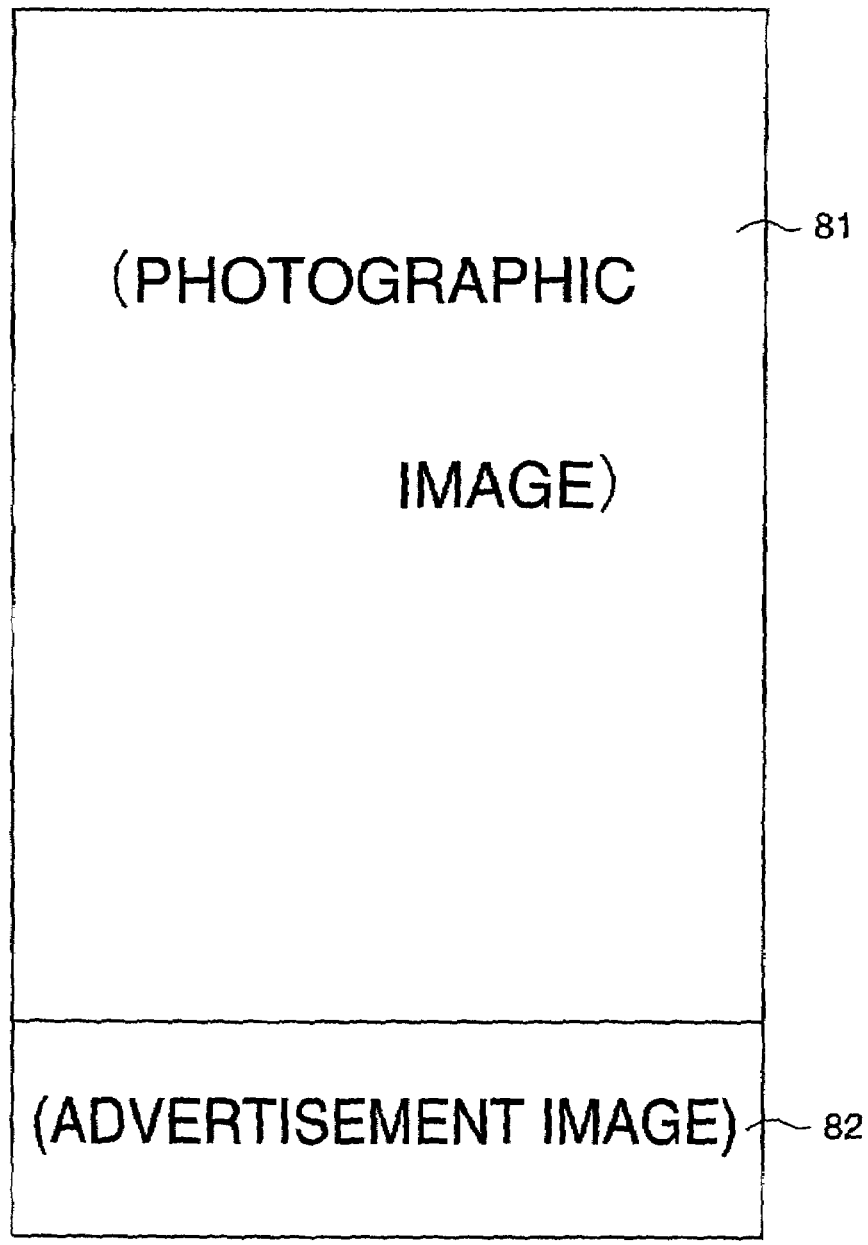
FIGS. 11 through 15 are schematic diagrams showing examples of a layout of photographic and advertisement images on a printed matter.
Figure 12:
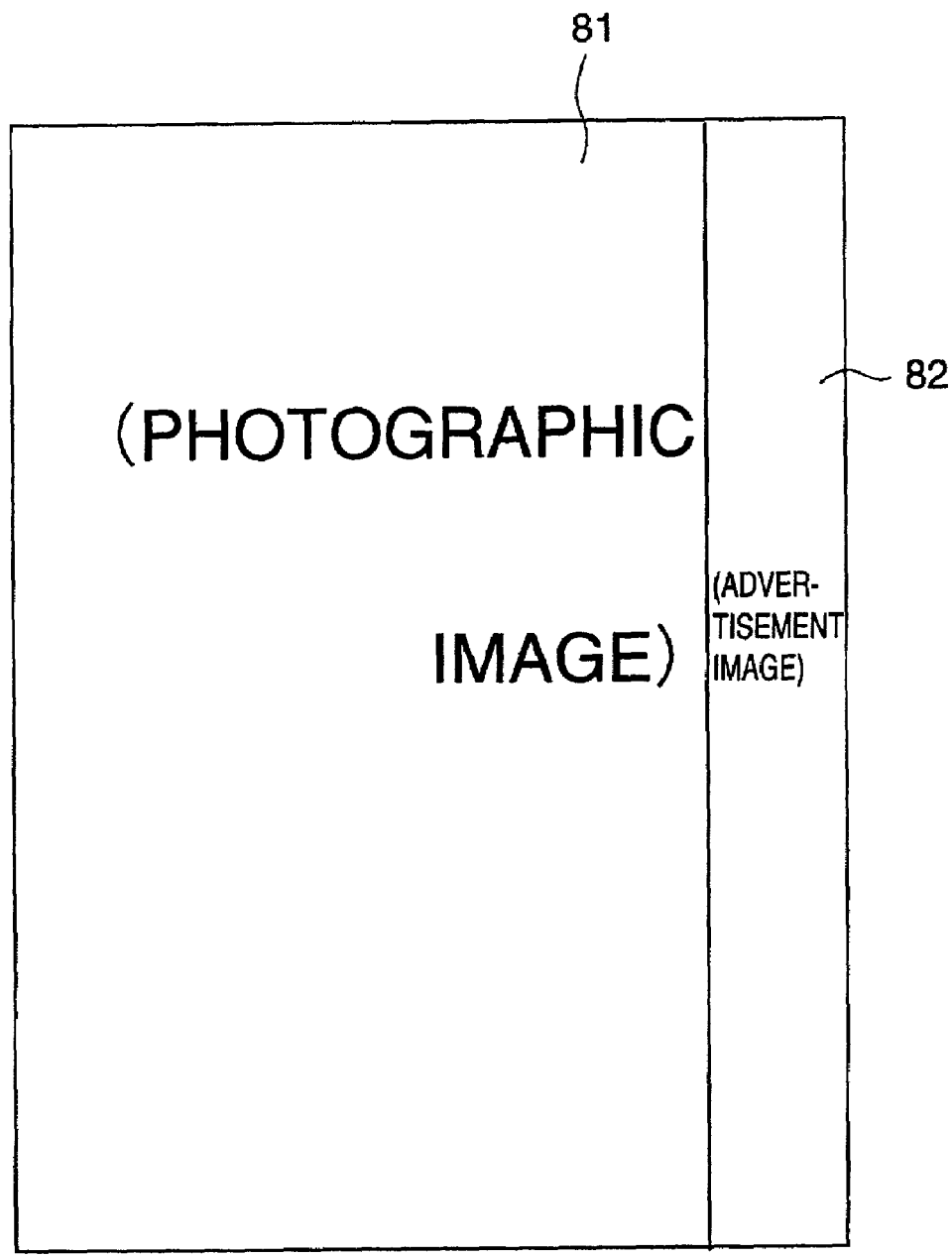

FIGS. 11 and 12 show examples where the whole photographic image is vertical and an advertisement image 82 is laid out below or on the side of a photographic image 81 serving as a main portion. In both of the examples of FIGS. 11 and 12, the viewed directions of the photographic image 81 and advertisement image 82 are the same, so that both images can be correctly viewed.

Figure 13:
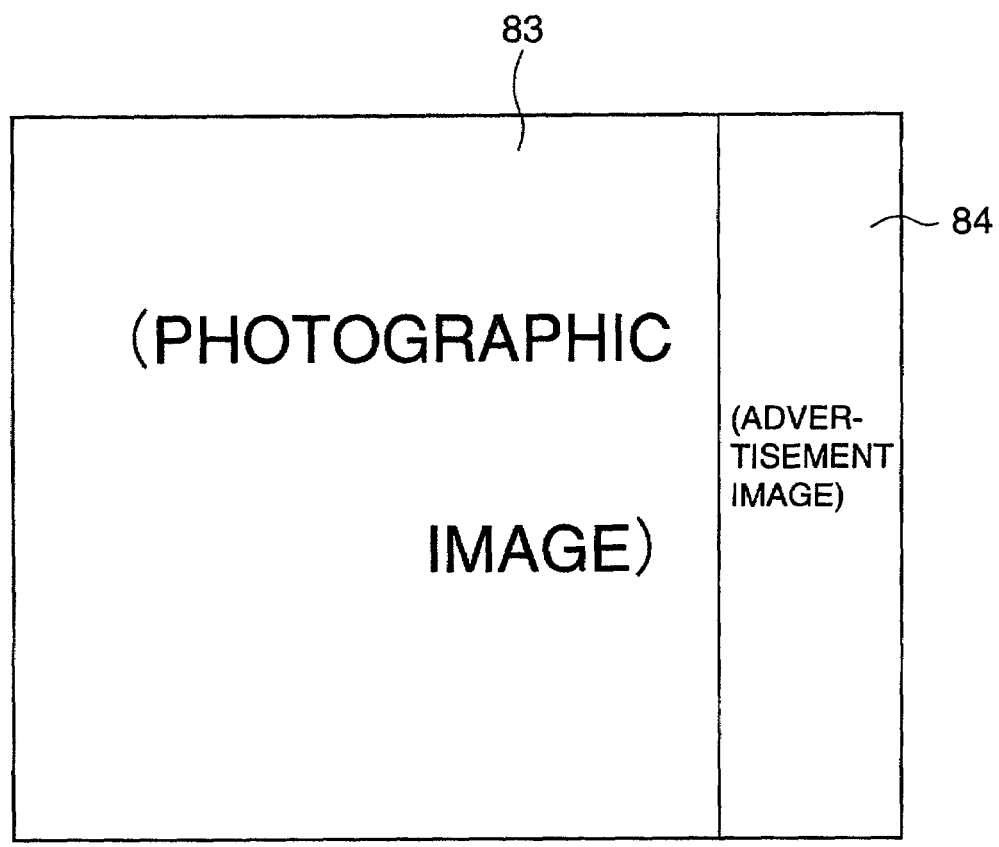
Figure 14:
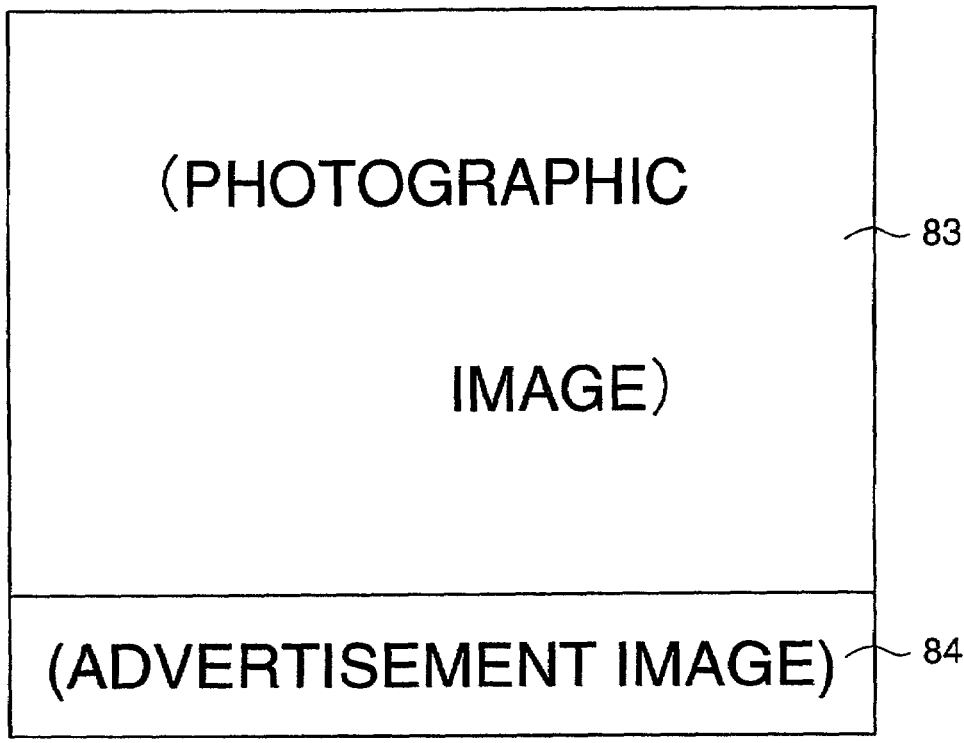

FIGS. 13 and 14 show examples where the whole photographic image is horizontal and an advertisement image 84 is laid out on the side of or below a photographic image 83 serving as a main portion. In both of the examples of FIGS. 13 and 14, the viewed directions of the photographic image 83 and advertisement image 84 are the same, so that both images can be correctly viewed.

Figure 15:
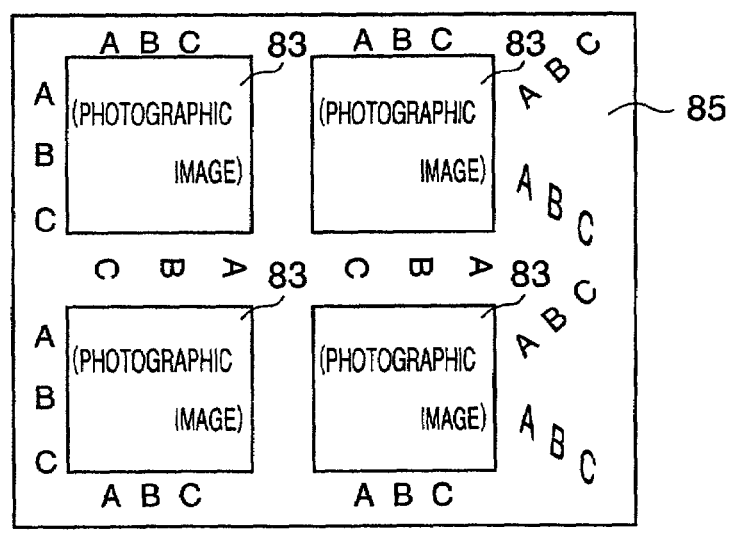

FIG. 15 shows an example where four scenes of photographic images 83 are allocated to one printed matter and an advertisement image 85 is laid out in a region between the respective photographic images 83. In the example of FIG. 15, the advertisement image 85 is shown by characters "ABC", but it should not be limited thereto. The advertisement image 85 may be an optional image such as a photographic image. However, in the example of FIG. 15, an advertisement image having a light color tone is preferably provided in order to facilitate the observation of the photographic images.

When the photographic image(s) and the advertisement image are laid out on the printed matter as shown in FIGS. 11 through 15, the vertical and horizontal dimensions of the images are preferably suitably reduced or enlarged so that the images are included in the printed matter in a normal state so as not to cut the edges of the images at the assigned positions. However, the reduction and enlargement ratios of the vertical and horizontal dimensions are preferably adjusted so as to prevent the original images from changing.

When the photographic image and the advertisement image are laid out on the printed matter as shown in FIGS. 11 through 14, the printed matter may be perforated so as to be cut at the boundary between the photographic image and the advertisement image.

While the store servers 60 and 70 of the personal image information recording/outputting system 1' shown in FIG. 6 have been installed in two areas, the number of store servers and installed areas should not be limited thereto, but a large number of store servers may be installed in a large number of areas. Furthermore, the network 56 means a network mainly including Internet or the like, and includes all of communication media having a transmission speed sufficient to transfer photographic image data and so forth, such as dedicated lines, CATV (cable television) networks, dial-up connection networks and LANs (local area networks).

Figure 7:
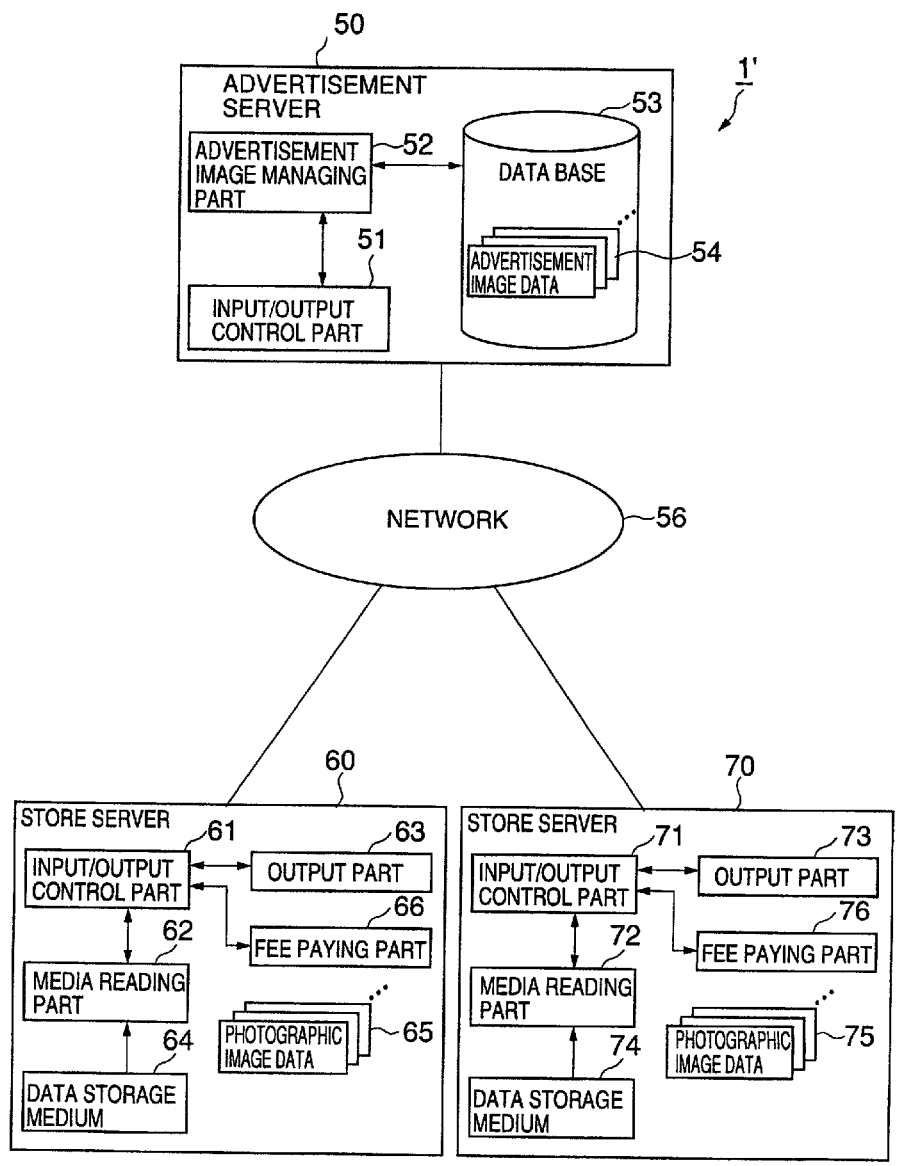
FIG. 7 is a schematic diagram showing another example of the second preferred embodiment of a personal image information recording/outputting system according to the present invention.

As shown in FIG. 7, the personal image information recording/outputting system 1' shown in FIG. 6 may be provided with fee paying parts 66 and 76 of a coin input type or the like for executing a fee paying processing, in the store servers 60 and 70, respectively. After a hundred-yen coin or the like is thrown into a fee paying opening of the fee paying part 66 or 76 to execute the fee paying processing, the output part 63 or 73 may output a printed matter on which a photographic image and an advertisement image are laid out in accordance with a predetermined format. Furthermore, since it is herein premised that the advertisement image data, which have been registered by paying the advertisement rate by the advertiser, together with the photographic image data, are recorded, it is possible to subtract the advertisement rate from the charge for a printed matter where only the photographic image data are simply recorded, so that it is possible to acquire the printed matter at a low charge. For example, a printed matter conventionally provided at a charge of 500 yen can be provided at a charge of 300 yen.

Figure 8:
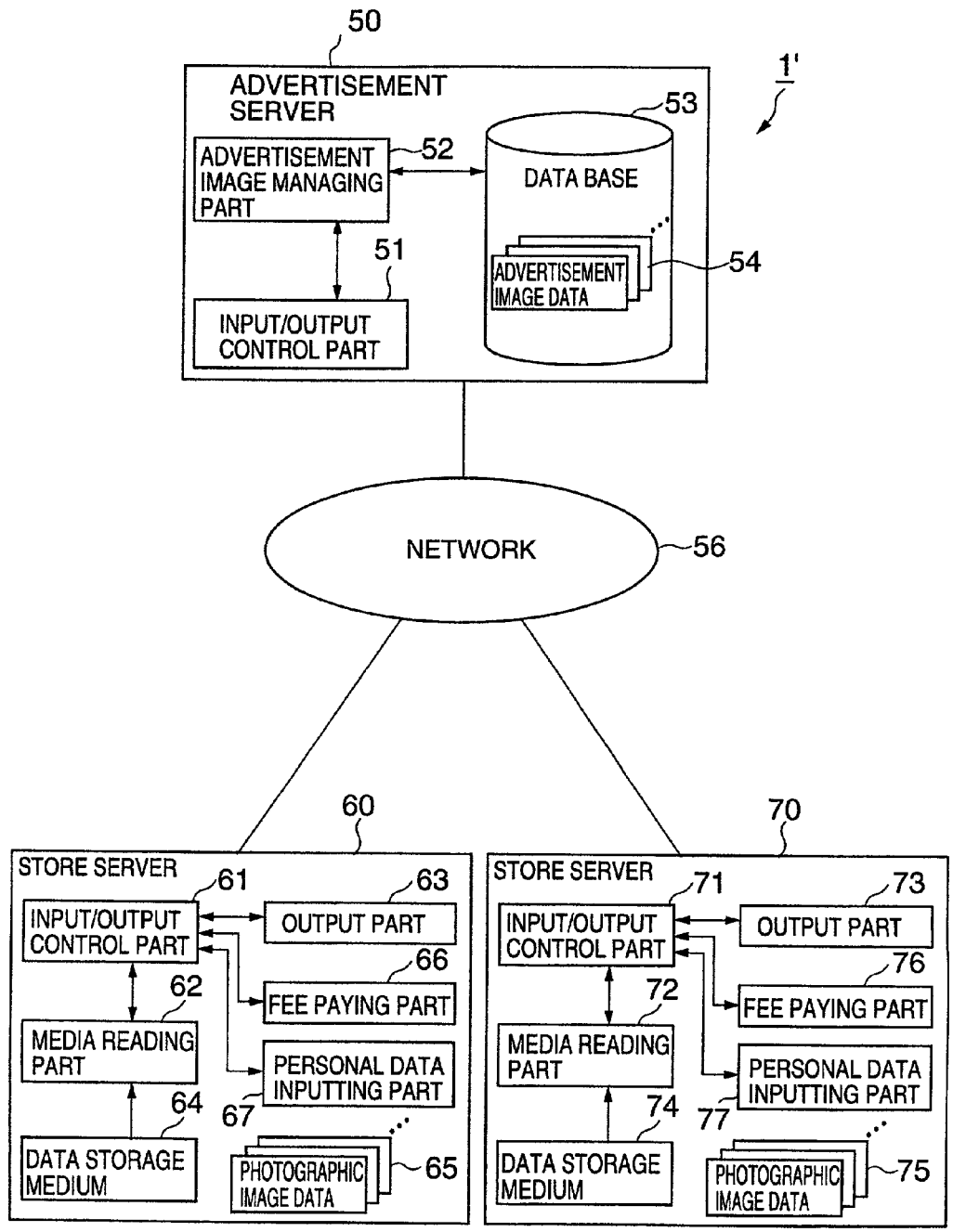
FIG. 8 is a schematic diagram showing a further example of the second preferred embodiment of a personal image information recording/outputting system according to the present invention.

Moreover, as shown in FIG. 8, the store servers 60 and 70 of the personal image information recording/outputting system 1' shown in FIG. 7 may be provided personal data inputting parts 67 and 77 for classifying personal information on photographic image data, which have been read by the media reading parts 62 and 62, to input the classified personal information as personal data, respectively, so that the personal data on the picked-up photographic image data, together with the photographic image data, may be stored in a dedicated server or the like. Thus, when the photographic image data stored in the dedicated server or the like is outputted, appropriate advertisement image data related to the photographic image data can be retrieved and extracted on the basis of the personal data inputted by the personal data inputting part 67 or 77.

Furthermore, as a system for inputting such personal data, there may be adopted a fixed coding system for electing a distinction between one or more persons and animals and plants about an object(s), sexuality, date and so forth from a predetermined hierarchy. If the classification of personal information using such a fixed coding system leaves something to be desired, a system for directly inputting keywords characterizing personal information may be used together with the fixed coding system.

Furthermore, as the personal data inputted by the personal data inputting parts 67 and 77, personal information on the photographic image data, e.g., data for more accurately identifying a person, such as a full name, age (a personal age, not the assignment of a range such as date) and the position in a family make-up (the first-born son, the first-born daughter, grandchild, etc.), may be inputted as variable codes. Thus, the dedicated server or the like can have a so-called album managing function of collectively managing photographic images of the person and/or members of the person's family. Specifically, for example, if the first-born son "Dainippon Ichiro" is identified in the store server 60 or 70, all of the photographic images of "Dainippon Ichiro" can be retrieved and extracted, and if necessary, all of the photographic images in his primary school days can be edited to be outputted as an index print so that a plurality of, e.g., 36, photographic images are laid out on a single printed matter at a scale of 1 to 36. Thus, the photographic images of a person and/or members of the person's family can be suitably edited and outputted. It is also possible to provide a service wherein the calculation of the age(s) of the person and/or members of the person's family and the confirmation of an engagement, a wedding and so forth are carried out in accordance with the increase of the age(s) of the person and/or members of the person's family, e.g., in accordance with commemoration at the turning points in the person and/or members of the person's family, such as a birth, a festival for children of three, five and seven years of age, entrance into a kindergarten, entrance into a primary school, entrance into a junior high school, entrance into a high school, entrance into a university, a coming-of-age ceremony, entrance into employment, an engagement, a wedding ceremony and a birth, and a direct mail is dispatched every the turning point or a printed matter having a cabinet size is sent every birth day to the person and/or members of the person's family from a related client.

The operation of the second preferred embodiment of the present invention with this construction will be described below. The operation of the personal image information recording/outputting system 1' shown in FIG. 7 will be herein described as an example.

Figure 9:
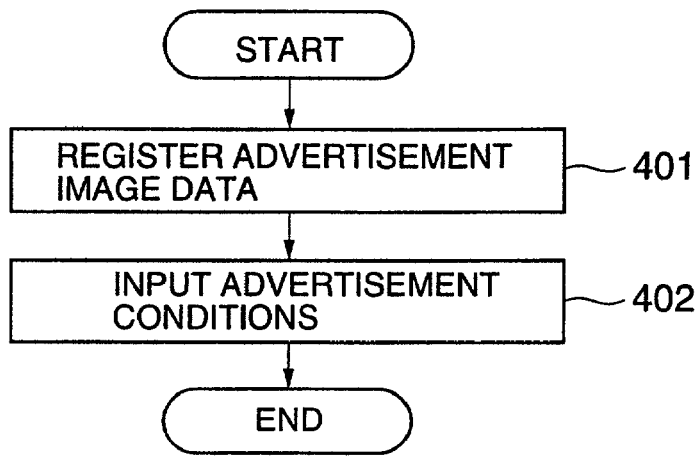
FIG. 9 is a flow chart for explaining the flow of a processing for registering advertisement image data, in the second preferred embodiment of a personal image information recording/outputting system according to the present invention.

FIG. 9 is a flow chart for explaining the flow of a processing for registering advertisement image data in the personal image information recording/outputting system 1' shown in FIG. 7.

As shown in FIG. 9, first, advertisement image data 54 intended to be given wide publicity by an advertiser is stored in the data base 53 of the advertisement server 50 by means of the advertisement image managing part 52 of the advertisement server 50 (step 401).

At this time, the advertiser decides conditions on an advertisement appearing period, an advertisement appearing frequency, an advertisement rate and so forth to make a contract with a company or organization for managing the advertisement server 50, and inputs the contents of the contract (the conditions on advertisement), together with the advertisement image data 54, to the advertisement server 50 (step 402).

Figure 10:
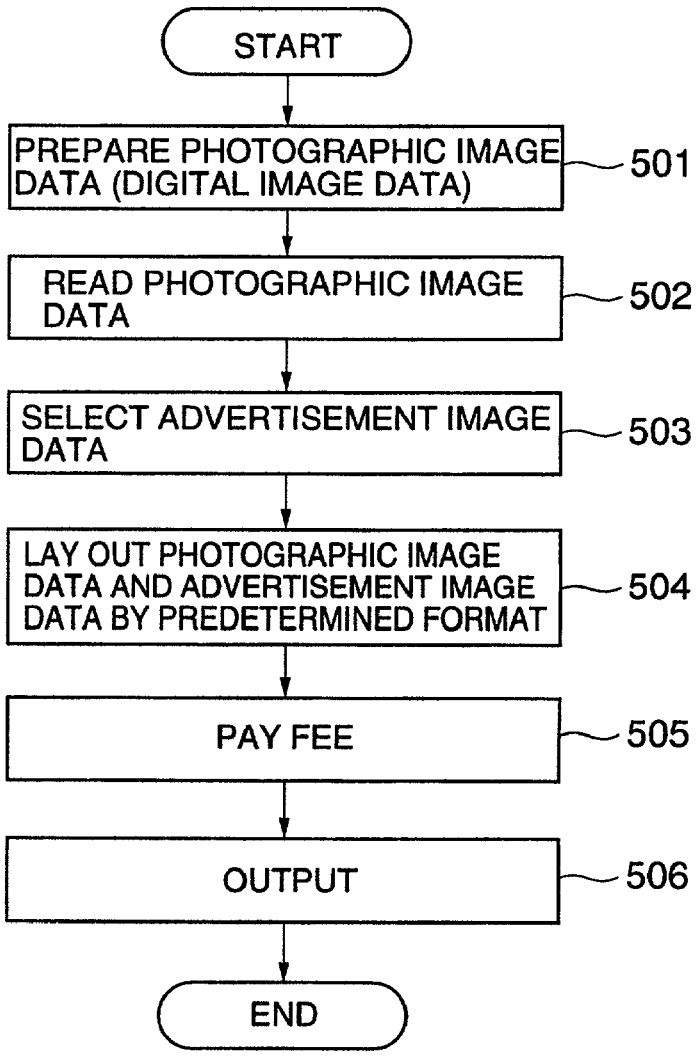
FIG. 10 is a flow chart for explaining the flow of a processing for outputting a printed matter, on which photographic and advertisement images are laid out in accordance with a predetermined format, in the second preferred embodiment of a personal image information recording/outputting system according to the present invention.

FIG. 10 is a flow chart for explaining the flow of a processing for outputting a printed matter, on which photographic and advertisement images are laid out in accordance with a predetermined format, in the personal image information recording/outputting system 1' shown in FIG. 7.

As shown in FIG. 10, first, a picture of a face or the like of an object is taken by a digital camera to prepare photographic image data (digital image data) (step 501). The photographic image data thus prepared are stored in the data storage media 64 or 74.

Then, the photographic image data thus stored in the data storage media 64 or 74 are read by the media reading part 62 or 72 of the store server 60 or 70 (step 502).

Thereafter, using the advertisement image managing part 52 of the advertisement server 50, advertisement image data 54 meeting required conditions are selected and extracted by a predetermined method from a plurality of advertisement image data 54 which have been stored in the data base 53 by a plurality of advertisers (step 503). Specifically, for example, specific advertisement image data may be selected at a predetermined frequency so that a required advertisement image is laid out to be outputted on one of ten printed matters when the total number of the outputs of the advertisement image data using one printer reaches 10, or specific advertisement image data of an advertiser closely related to babies, such as a paper diaper manufacturer, a baby food manufacturer or a baby clothing manufacturer, may be selected when the object of the photographic image data is a baby.

Then, the advertisement image data 54 thus extracted are transferred from the advertisement server 50 to the store server 60 or 70 via the network 56, and the photographic image data obtained at step 502 and the advertisement image data thus transferred are laid out in accordance with a predetermined format (step 504).

Thereafter, a fee is paid for the output of the photographic image data (the output as a printed matter, the writing in a data storage media, or the like), by means of the fee paying part 66 or 76 of the store server 60 or 70 (step 505). Furthermore, since it is herein premised that the advertisement image data, which have been registered by paying the advertisement rate by the advertiser, together with the photographic image data, are recorded, it is possible to subtract the advertisement rate from the charge for a printed matter where only the photographic image data are simply recorded, so that the fee required at step 505 is a low set fee (free of charge according to circumstances).

Finally, after the fee paying part 66 or 76 executes the fee paying processing, the output part 63 or 76 outputs the photographic image data (step 506). The photographic image data are outputted as a full-color printed matter (hard copy) or written in a data storage medium such as a smart medium.

Furthermore, the processing shown in FIG. 9 is carried out when the photographic image data are first prepared. When the photographic image data have been read once to be stored in the dedicated server or the like, if a member of the person's family or the person's friend inputs an appropriate pass-word, authentication number or identification code, the photographic image data can be taken out of the dedicated server or the like. Also in this case, the photographic image data can be outputted by the same processing as that shown in FIG. 9.

The processes shown in FIGS. 8 and 9 can be realized as a program or control box for carrying out a series of operations and processes in the advertisement server 50 and the store servers 60 and 70.

Thus, according to the second preferred embodiment of the present invention, the photographic image data which have been read by the media reading part 62 or 72 of the store server 60 or 70, together with the advertisement image data which have been extracted by the advertisement image managing part 52 of the advertisement server 50, are outputted by the output part 63 or 73. Therefore, it is possible to subtract the advertisement rate from the charge for a printed matter where only the photographic image data are simply recorded, so that it is possible to acquire the printed matter at a low charge. In addition, since the advertisement image data are recorded on the printed matter on which the photographic image data are recorded, advertisement information capable of being permanently stored as an output matter can be inexpensively provided via a network such as Internet. Moreover, the current information which is periodically updated can be provided as the advertisement image data, and the user can not only enjoy the photographic image data, but the user can also hold the current, appropriate advertisement information. This is very useful.

What is claimed is:

1. A personal image information recording/outputting system comprising:
   photographic image reading means for reading a photographic image datum;
   personal data inputting means for classifying personal information on said photographic image datum, which is read by said photographic image reading means, to input the classified personal information as a personal datum;
   photographic image managing means for storing said photographic image datum and said personal datum and for retrieving and extracting a photographic image datum meeting required conditions, on the basis of said personal datum;
   use consent advisability registering means for registering advisability of permission for third parties to use said photographic image datum which is read by said photographic image reading means, per photographic image datum;
   fee paying means for executing a fee paying processing for specific photographic image datum that is registered to give permission for third parties to use the photographic image datum; and
   output means for outputting the specific photographic image datum after the fee paying processing is executed by said fee paying means,
   wherein said photographic image managing means manages said photographic image datum so that a photographic image datum, which has been registered to give permission for third parties to use the photographic image datum, among a plurality of photographic image data that has been read by said photographic image reading means, can be taken out by persons concerned with an owner of the registered photographic image datum or third parties.

2. A personal image information recording/outputting system as set forth in claim 1, wherein said photographic image reading means, said personal data inputting means, said use consent advisability registering means and said output means are provided in a store server, and said photographic image managing means is provided in a center server which is connected to said store server via a network.

3. A personal image information recording/outputting system as set forth in claim 1, wherein said photograph image reading means reads a photograph image datum, which has been picked up by a digital camera to be stored in a data storage medium, from said data storage medium.

4. A personal image information recording/outputting system as set forth in claim 1, wherein said fee paying means changes setting of a fee in accordance with the advisability of permission for third parties to use, which has been registered by said use consent advisability registering means.

5. A personal image information recording/outputting method comprising the steps of:
   reading a photographic image datum;
   selecting and extracting an advertisement image datum meeting required conditions, from a plurality of advertisement image data that has been stored in a data base;
   executing a fee paying processing for a specific photographic image datum, which is to be output together with the advertisement image datum; and
   outputting the specific photographic image datum, together with the extracted advertisement image datum, after the fee paying processing is executed.

6. A personal image information recording/outputting system comprising:
   photographic image reading means for reading a photographic image datum;
   advertisement image managing means for storing an advertisement image datum and for selecting and extracting an advertisement image datum meeting required conditions;
   fee paying means for executing a fee paying processing for a specific photographic image datum that is to be output together with the advertisement image datum; and
   output means for outputting the specific photographic image datum together with said advertisement image datum after said fee paying processing is executed by said fee paying means.

7. A personal image information recording/outputting system as set forth in claim 6, wherein said photographic image reading means and said output means are provided in a store server, and said advertisement image managing means is provided in an advertisement server which is connected to said store server via a network.

8. A personal image information recording/outputting system as set forth in claim 6, wherein an output matter outputted from said output means is a printed matter on which a photographic image and an advertisement image are laid out in accordance with a predetermined format.

9. A personal image information recording/outputting system as set forth in claim 6, further comprising personal data inputting means for classifying personal information on said photographic image datum, which is read by said photographic image reading means, to input the classified personal information as personal datum,
   wherein said advertisement image managing means retrieves and extracts an advertisement image datum on the basis of said personal datum which is inputted by said personal data inputting means.

10. A personal image information recording/outputting system as set forth in claim 6, wherein said photographic image reading means reads a photographic image datum, which has been picked up by a digital camera to be stored in a data storage medium, from said data storage medium.

11. A personal image information recording/outputting method comprising the steps of:

reading a photographic image datum; registering advisability of permission for third parties to use the read photographic image datum, per photographic image datum;

storing a photographic image datum, which is registered to give permission for third parties to use the photographic image datum, among a plurality of read photographic image data, together with a personal datum that is obtained by classifying personal information on the read photographic image datum, in a data base; and executing a fee paying processing for a specific photographic image datum that is registered to give permission for third parties to use the photographic image datum; and outputting the specific photographic image datum after the fee paying processing is executed.

12. A personal image information recording/outputting method as set forth in claim 11, further comprising a step of retrieving and extracting a photographic image datum meeting required conditions, from the read photographic image data, which has been stored in said data base, on the basis of said personal datum.

* * * * *